July 1, 1958  C. C. STUART  2,841,436
MOTOR CAR CARRIER WITH SELF-ADJUSTING TRACK
Filed Oct. 15, 1954  2 Sheets-Sheet 1
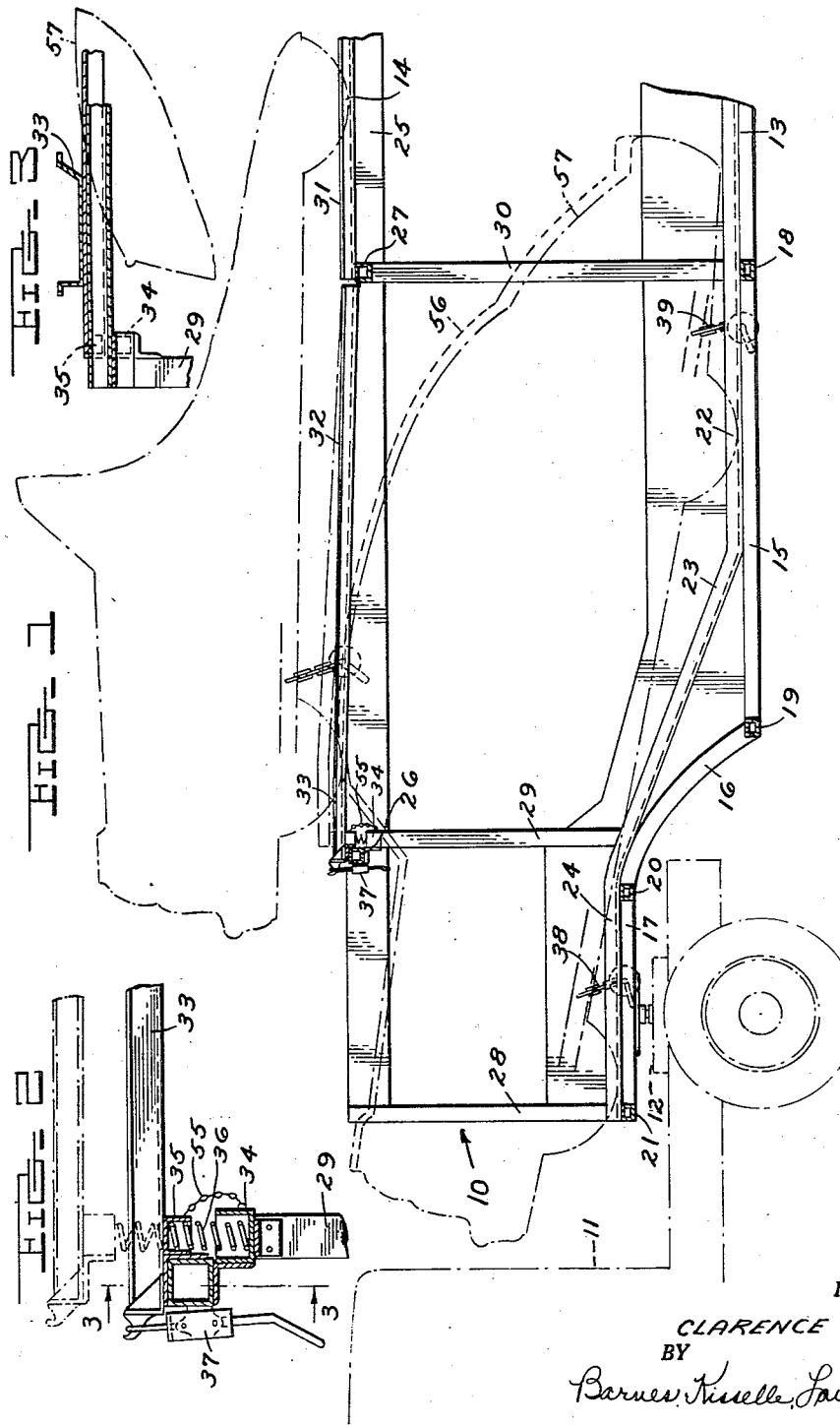
INVENTOR.
CLARENCE C. STUART
BY
Barnes, Kisselle, Laughlin & Raisch
ATTORNEYS

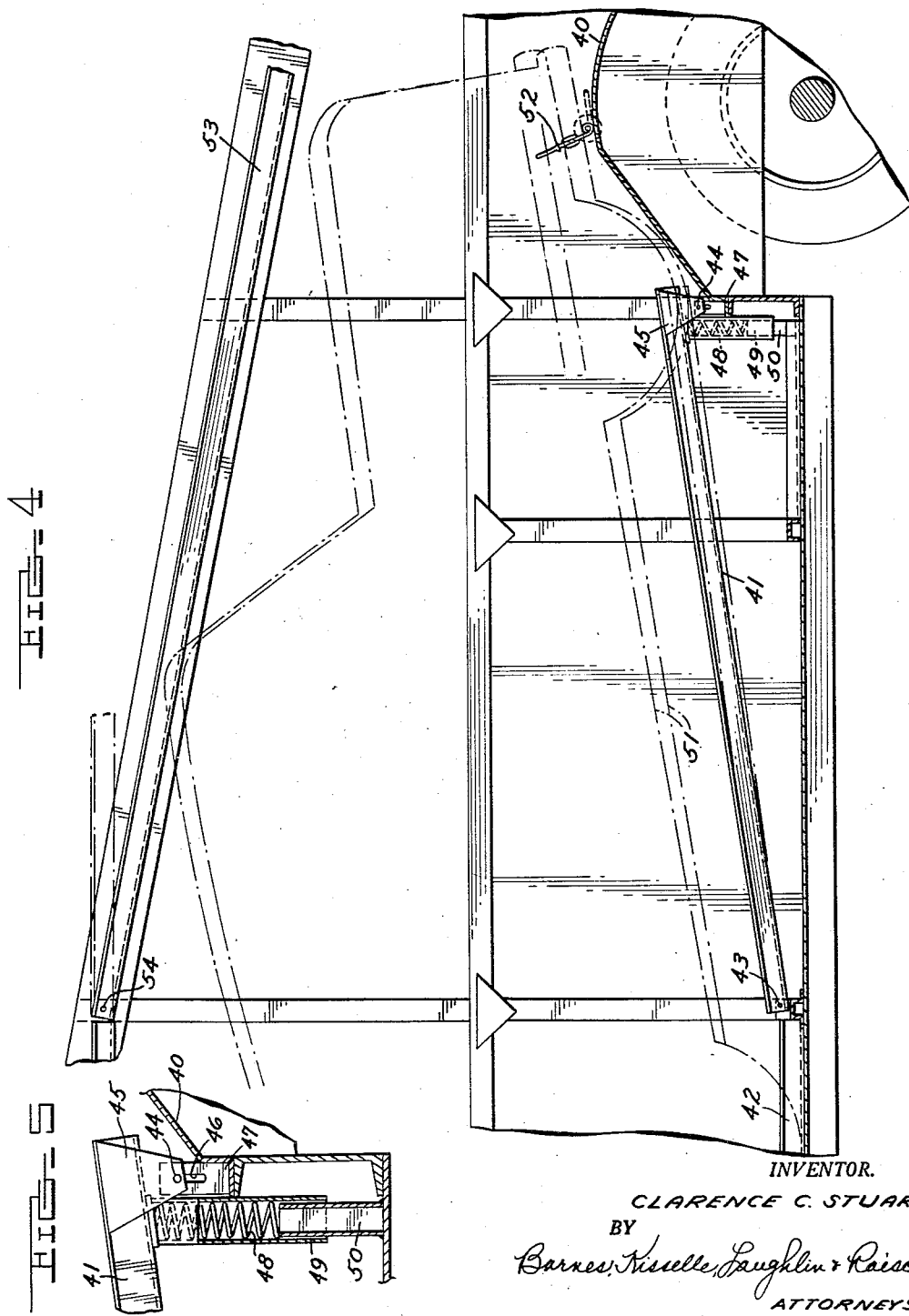

United States Patent Office 2,841,436
Patented July 1, 1958

2,841,436

MOTOR CAR CARRIER WITH SELF-ADJUSTING TRACK

Clarence C. Stuart, Dearborn, Mich., assignor to Traffic Transport Engineering, Inc., Dearborn, Mich., a corporation of Michigan Application October 15, 1954, Serial No. 465,519

7 Claims. (Cl. 296—1)

This invention relates to motor car carriers and more particularly to carriers of the type having a tractor and trailer.

One type of motor car carrier in conventional use comprises a tractor and trailer. The trailer is provided with a pivotal connection at one end thereof between the tractor and trailer. Such trailers conventionally comprise vertically spaced track sections on to which the vehicles or motor cars are driven and thereafter supported during transport. Due to the construction of the trailers, portions of the track are necessarily inclined. In being driven over the inclined portions the vehicles require, in many instances, greater clearance than is necessary after the vehicles are in position on the trailer and especially after the vehicles are tied down. In order that sufficient clearance will be permitted during loading of the carrier, structural portions of the trailers are customarily made of greater height than is required during transport.

It is therefore an object of this invention to provide a novel trailer structure wherein the necessary clearance is provided for the vehicles during loading of the carrier, but the overall height of the carrier is less after loading of the carrier and during transport.

Basically the invention comprises providing portions of the track sections having limited vertical movement and means for resiliently holding said portions in their uppermost position during the vehicle loading operation.

Referring to the accompanying drawings:

Fig. 1 is a fragmentary sectional elevational view of the front end of a trailer, the tractor and vehicles being shown in dotted lines.

Fig. 2 is a fragmentary part sectional elevational view of a portion of the structure shown in Fig. 1 on a greatly enlarged scale.

Fig. 3 is a part sectional elevational view to the line 3—3 on Fig. 2.

Fig. 4 is a fragmentary sectional elevational view of the rear end of a trailer, the vehicle being shown in dotted lines.

Fig. 5 is a part sectional elevational view of a portion of the track shown in Fig. 4.

As shown in Fig. 1, a trailer 10 is pivotally connected to tractor 11 by means of a fifth wheel 12. The trailer comprises a lower track section 13 and an upper track section 14. Each of the track sections comprises parallel spaced longitudinally extending tracks, as presently described.

At the forward end of the trailer the lower track section 13 includes longitudinally extending members 15, 16 and 17 and transverse struts 18, 19, 20 and 21. The tracks are supported on the lower section and include substantially horizontal portions 22, inclined portions 23 extending upwardly toward the front end of the trailer, and short substantially horizontal portions 24 extending forwardly from the ends of the inclined portions 23.

The upper track section 14 includes longitudinally extending members 25 spaced apart by transverse struts 26, 27 and vertically spaced from the lower section by vertical struts 28, 29 and 30. Parallel spaced and longitudinally extending tracks are mounted on the upper section and comprise horizontal track portions 31 and movable track portions 32 pivotally mounted to the transverse strut 27. A strut 33 extends between the movable tracks 32.

Means is provided for resiliently holding the movable track portions 32 in their uppermost position, shown in broken lines in Figs. 1 and 2, and comprises a channel 34 mounted on the vertical strut 29 and a second channel 35 mounted on the strut 33, with a spring 36 interposed between the channels and forcing the strut 33 together with the track portions 32 upwardly. A similar spring may be provided on the strut diametrically opposite strut 29 (not shown). A chain 55 extends between channels 34 and 35 to limit the upward movement of the movable track portions 32. Releasable latch means 37 may be provided to hold the movable track portions 32 downwardly against the spring pressure.

Referring to Fig. 1, it can be seen that as a vehicle is driven into position on the lower track section, portoins thereof project upwardly a greater distance, as shown by the broken lines 56, than after the vehicle is in position and tied down as indicated by broken lines 57. By the aforementioned construction sufficient clearance is provided for movement of the vehicle into the position shown by broken lines 56. After the vehicle is in position on the lower track section it is tied down against the action of its spring suspension system by conventional tie-down chains 38, 39 actuated by pulleys with ratchet mechanisms (not shown). When tied down, the vehicle assumes the position indicated by broken lines 57. Thereafter when a vehicle is loaded on to the upper track section 32, the weight of the vehicle compresses springs 36 and pivots track section 32 downwardly to its lowermost position in which it may be clamped by the latch means 37. In this manner the overall height of the carrier is automatically lowered without diminishing or eliminating the necessary clearance. With the upper movable track portion 32 in its lowermost position, insufficient clearance is provided for the lower vehicle unless the lower vehicle is tied down as illustrated.

As shown in Fig. 4, the rear end of the trailer is provided with a ramp 40 over the rear wheel housing, substantially horizontal track portions 42, movable track sections 41 extending between the ramp 40 and the substantially horizontal track portions 42. One end of each movable track is pivoted as at 43 while the end nearest the ramp 40 has limited movement as permitted by the pin 44 mounted on bracket 45 and movable in slot 46 of channel member 47. A spring 48 resiliently holds the movable track in its uppermost position, shown in full lines in Fig. 4, and is guided by telescopic sections 49 and 50. The spring 48 is sufficiently rigid that movement of the vehicle onto the movable track 41 does not compress the spring.

By this construction the movable section is retained at an angle inclined sufficiently to permit clearance of the under part 51 of a vehicle as the vehicle is moved into position on the lower tracks of the carrier. After the vehicle has been loaded on the carrier, the vehicle may be tied down into position by conventional tie-down chains 52, pushing the track 41 downwardly against the spring 48 and compressing the suspension springs on the vehicle, thereby lessening the overall height of the vehicle above the ground. In this manner the upper track sections 53, which are pivoted at 54, may be also moved downwardly a greater distance thereby lessening the overall height of the loaded carrier.

I claim:

1. A trailer for transporting vehicles having means at the front end thereof for forming a pivotal connection with a tractor, said trailer comprising a lower track section and an upper track section vertically spaced from and overlying the lower track section, each said track section comprising parallel spaced longitudinally extending track portions, said lower section having inclined portions extending upwardly and forwardly toward the front end of the trailer, said upper section having stationary portions and vertically movable track portions overlying said inclined portions of the lower section, said movable portions having the rear ends thereof pivotally mounted adjacent the forward ends of the stationary portions of said upper section, whereby the forward end thereof nearest the front end of the trailer has limited vertical swinging movement, and means for resiliently holding said movable portions in their uppermost position, said means having insufficient force to maintain said movable track portions in their uppermost position when a vehicle is driven from said stationary portions of said upper section forwardly onto the movable track portions, whereby said movable track portions pivot downwardly as a vehicle is driven onto said movable track portions.

2. A trailer as called for in claim 1 wherein the movable portions of said upper tracks when in lowered position are spaced vertically from said inclined portions of the lower section to provide insufficient clearance for a vehicle therebetween.

3. The method of loading a trailer for transporting vehicles which comprises positioning a first vehicle on the trailer with the longitudinal axis thereof inclined to the horizontal, tying down said first vehicle against the action of its suspension system thereby reducing the overall height of the vehicle, and progressively pivoting the end of a second vehicle downwardly to a position overlying said first vehicle to a level below that to which downward movement of the end of the second vehicle would be limited if the first vehicle had been left at its initial overall height.

4. A trailer for transporting vehicles having means at one end thereof for forming a pivotal connection with a tractor, said trailer comprising a lower track section and an upper track section vertically spaced from and overlying the lower track section, each said track section comprising parallel spaced longitudinally extending track portions, a wheel at one end of said trailer for supporting said trailer, a generally curved ramp overlying said wheel and over which vehicles are driven to place said vehicles in position on the trailer, a track portion extending from a point adjacent said ramp and inclined in a direction generally downwardly and toward the front of the trailer, said last mentioned track portion being mounted for limited vertical movement, means for resiliently holding said movable track portion in its uppermost position, said means having sufficient force that the track portion remains in its uppermost position when a vehicle is driven over the track portion, and means for moving the movable track portion downwardly against the action of the latter means after the vehicle has been driven into position on the movable track portion.

5. A trailer for transporting vehicles having means at one end thereof for forming a pivotal connection with a tractor, said trailer comprising a lower track section and an upper track section vertically spaced from and overlying the lower track section, each said track section comprising parallel spaced longitudinally extending track portions, a wheel at one end of said trailer, a generally curved ramp overlying said wheel and over which vehicles are driven to place said vehicles in position on the trailer, a movable track portion extending from a point adjacent said ramp and inclined in a direction generally downwardly and toward the front of the trailer, the end of said movable track portion farthest from said ramp being pivoted while the other end of said ramp is free to move in a generally arcuate path, means for resiliently holding said movable track portion in its uppermost position, said means having sufficient force that the track portion remains in its uppermost position when a vehicle is driven over the track portion, and means for moving the movable track portion downwardly against the action of the latter means after the vehicle has been driven into position on the movable track portion.

6. A trailer for transporting vehicles having a lower supporting frame, a pair of tracks on said lower supporting frame, said vehicle having an upper supporting frame and a pair of tracks thereon overlying the tracks on the lower supporting frame, said vehicle having adjacent the rear end thereof a wheel housing projecting upwardly above the plane of said lower supporting frame and over which the vehicles to be supported on the lower tracks must be driven when being loaded into the trailer, said lower tracks having a portion at the rear end thereof pivotally supported at a point spaced forwardly of said wheel housing and being inclined upwardly and rearwardly in the direction of said wheel housing, said last mentioned track portions being yieldably supported at their free rear ends for limited vertical movement, said rear track portions in their uppermost position providing sufficient clearance between said wheel housing and the under structure of the vehicle to enable driving the vehicle over said wheel housing and onto said lower tracks, said rear track portions being pivotable downwardly after a vehicle is loaded thereon to reduce the overall height of the trailer at the rear portion thereof.

7. A trailer as called for in claim 6 wherein the rear portions of said upper tracks are pivotally supported for movement between raised and lowered positions at the rear end thereof, said rear portions of the upper track when in lowered position being spaced vertically from said movable portion of the lower tracks when in raised position to provide insufficient clearance for a vehicle therebetween.

References Cited in the file of this patent

UNITED STATES PATENTS

| | | |
|---|---|---|
| 1,841,066 | Simning | Jan. 12, 1932 |
| 2,123,630 | Judd | July 12, 1938 |
| 2,385,115 | Stuart | Sept. 18, 1945 |
| 2,694,597 | Kunz | Nov. 16, 1954 |